United States Patent
Aggarwal et al.

(10) Patent No.: US 6,879,717 B2
(45) Date of Patent: Apr. 12, 2005

(54) AUTOMATIC COLORING OF PIXELS EXPOSED DURING MANIPULATION OF IMAGE REGIONS

(75) Inventors: Gaurav Aggarwal, New Delhi (IN); Sugata Ghosal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 09/782,937

(22) Filed: Feb. 13, 2001

(65) Prior Publication Data

US 2002/0136453 A1 Sep. 26, 2002

(51) Int. Cl.$^7$ ................................................ G06K 9/00
(52) U.S. Cl. .................................... 382/167; 358/518
(58) Field of Search .............................. 382/162–167; 358/518–520; 345/587–603; 348/584–592

(56) References Cited

U.S. PATENT DOCUMENTS

| 5,047,842 | A | * | 9/1991 | Bouman et al. | 358/515 |
| 5,335,086 | A | * | 8/1994 | Kitamura | 358/463 |
| 6,175,663 | B1 | * | 1/2001 | Huang | 382/284 |
| 6,434,269 | B1 | * | 8/2002 | Hamburg | 382/163 |
| 6,571,012 | B1 | * | 5/2003 | Pettigrew | 382/167 |

* cited by examiner

*Primary Examiner*—Jingge Wu
(74) *Attorney, Agent, or Firm*—McGinn & Gibb, PLLC; T. Rao Coca, Esq.

(57) ABSTRACT

A system, method, and program storage device implementing the method for modifying images has the ability to assign color intensity values to pixels exposed during image manipulation operations. The method comprises using the color intensity values of remaining pixels in the original image, and assigning color values to the exposed pixels that are similar to those of the surrounding pixels so that the exposed regions blend smoothly with the surrounding region.

27 Claims, 6 Drawing Sheets

AUTOMATIC COLORING OF PIXELS EXPOSED DURING MANIPULATION OF IMAGE REGIONS

FIELD OF THE INVENTION

The present invention relates to a system, method and computer program product for achieving a visually acceptable rendering of an image that has been modified as a result of image manipulation operation by automatically assigning color values to a plurality of image pixels that have been "exposed" as a result of such operations.

BACKGROUND OF THE INVENTION

Image editing tools like Photoshop from Adobe Inc., Paint Shop Pro from JASC Inc. provide graphical user interfaces (GUIs) to the user for manipulating and editing parts or whole of an image. A user may mark regions in an image and do various kind of editing operations on selected regions. Operations like moving the region, deleting the region, rotating the region, scaling the size of the region (both increasing as well as reducing the size) and other such operations create blank areas in the modified image. By way of definition, an exposed pixel is one that belonged to the region manipulated by the user and because the pixel was either moved elsewhere or deleted, it now has no color value assigned to it, i.e., the exposed pixel is blank. Hence, image manipulation operations may lead to blank holes in the modified image which need to be filled in order to create a visually acceptable version of the modified image. Typically, a user desires to modify "objects" in an image and the image editing software may be supplemented with an automatic object-identification process (such as "magic wand" in Adobe Photoshop) to extract the objects in the image. In such cases the user then simply selects objects of interest in the image and proceeds to modify these. The automatic object-identification process may use various image segmentation schemes based on color and texture in the image.

Image pixels may also be exposed by automatic image manipulation and modification routines as disclosed by the inventors in the U.S. patent application Ser. No. 09/328,968 filed Jun. 9, 1999, for 'Aan interactive framework for understanding users perception of multimedia data' and U.S. patent application Ser. No. 09/407,434 filed Sep. 29, 1999 for "Efficient Modification Scheme for Learning User's Perception during Image Retrieval".

One known technique is that of assigning a uniform color, e.g., white or black, uniformly to all the exposed pixels. Image editing software such as Adobe Photoshop may allow the user to select the color(s) to be used for filling and an automatic image modification method may use a predetermined color or one calculated based on image properties. It may also be possible to fill the region with some repetitive pattern. However, this often results in an unacceptable and nonrealistic image specially if the region surrounding the exposed hole has some repetitive color patterns. A uniform color or a fixed repetitive pattern does not maintain continuity in color values with the surrounding regions and the filled hole stands out artificially. Also, this color assignment is mostly manual in nature.

Thus, there is a need to assign color intensity values like RGB (red-green-blue) to fill the hole created in the image in a manner such that exposed region merges with the surrounding region, i.e. the background, naturally.

Prior-art methods have used a-priori information about shading, illumination, shadowing information to render fixed geometric shapes in an image as disclosed by the inventors in U.S. Pat. No. 5,136,664. Their algorithm renders objects in an image whereas this invention renders the background after an object has been removed.

A method for interpolating pixels is disclosed in U.S. Pat. No. 5,222,204 for "Pixel Interpolation in Perspective Space" which accounts for non-linearity of distance changes in the perspective projection of 3-D objects onto images.

In U.S. Pat. No. 4,815,009 for "Algorithm for filling an Image Outline" a method for converting a region defined by vectors into a set of trapezoids is disclosed.

Similarly, a method for modifying image content is presented in the U.S. Pat. No. 4,725,966 for "Image Modification." Both these inventions, however, do not address the problems identified here.

THE OBJECTS AND SUMMARY OF THE INVENTION

The object of this invention is to automatically assign colour values to a plurality of image pixels that have been exposed as a result of image manipulation operations.

To achieve the said objective this invention provides a system for modifying images characterized in that it includes the ability to assign colour intensity values to pixels exposed during image manipulation operations comprising:
  means for using the color intensity values of remaining pixels in the original image, and
  means for assigning color values to the exposed pixels that are similar to those of the surrounding pixels so that the exposed regions blends smoothly with the surrounding region.

The above system includes means for assigning color values to pixels that are exposed during manual modifications of image regions by the user.

The above system includes means for assigning color values to pixels that are exposed during automatic modifications of said image regions.

The said means for assigning colour values assigns the value of colour intensity based on the colour intensity value function determined at that pixel's location.

The said color intensity value function used to assign values to exposed pixels is determined using the image model available a-priori.

The said color intensity value function used to assign values to exposed pixels is determined by fitting a function to the known color intensity values of pixels in the boundary regions of the exposed pixels.

The color intensity value function is approximated using energy minimization along with boundary conditions.

The said color intensity value function is based on a multi-point derivative estimation which is used as an approximation to the smoothness functional that is used to constrain the energy minimization.

The said means for assigning colour values assigns a colour value to an exposed pixel equal to the color intensity value of its mirror-image pixel found by looking into a hypothetical mirror placed along the boundary of the exposed region.

The said means for assigning colour values segments the original image into homogenous regions in order to restrict the pixels, which are used to assign intensity values to the exposed pixels by using:
  means for copying the intensity value from only that pixel location that belongs to the same segment as the boundary pixel which intersects the normal to the boundary and the boundary, means for copying the intensity value from only that pixel location that belongs to a segment with a minimum contact length with the exposed region.

The user explicitly restrains the area from where intensity values may be used to determined the intensity values that have to be assigned to the exposed pixels.

The said means where the original unmodified image was compressed using a lossy compression technique and wherein the said means for assigning colour values to the exposed pixels includes:

means for performing median filtering on the boundary pixels not belonging to the exposed region but surrounding the exposed region where the median filtering mask does not use the pixels inside the exposed region;

means for ensuring that the pixels that are closer than a predetermined distance to the exposed region boundary are not used while determining the intensity values of the exposed pixels.

The present invention further provides a method for modifying images characterized in that it includes the ability to assign colour intensity values to pixels exposed during image manipulation operations comprising:

using the color intensity values of remaining pixels in the original image, and assigning color values to the exposed pixels that are similar to those of the surrounding pixels so that the exposed regions blends smoothly with the surrounding region.

The above method includes generating manual modifications of the exposed pixel by the user.

The above method includes automatically modifying the regions of said image for filling colour intensity values for the said exposed pixels.

The said assigning of colour values assigns the value of colour intensity based on the colour intensity value function determined at that pixel's location.

The said color intensity value function used to assign values to exposed pixels is determined using the image model available a-priori.

The said color intensity value function used to assign values to exposed pixels is determined by fitting a function to the known color intensity values at the boundary pixels of the exposed region.

The color intensity value function is approximated using energy minimization along with boundary conditions.

The said color intensity value function is based on a multi-point derivative estimation, which is used as an approximation to the smoothness functional that is used to constrain the energy minimization.

The said assigning of colour values assigns a colour value to an exposed pixel equal to the color intensity value of its mirror-image pixel found by looking into a hypothetical mirror placed along the boundary of the exposed region.

The said assigning of colour values segments the original image to restrict the pixels, which are used to assign intensity values to the exposed pixels by using:

copying the intensity value from only that pixel location that belongs to the same segment as the boundary pixel which intersects the normal to the boundary and the boundary, copying the intensity value from only that pixel location that belongs to a segment with a minimum contact length with the exposed region.

The user explicitly restrains the area from where intensity values may be used to determined the intensity values that have to be assigned to the exposed pixels.

The for an original image that has been compressed using a lossy compression technique and wherein said means for assigning colour values to the exposed pixels includes:

performing median filtering on the boundary pixels not belonging to the exposed region but surrounding the exposed region where the median filtering mask does not use the pixels inside the exposed region;

ensuring that the pixels that are closer than a predetermined distance to the exposed region boundary are not used while determining the intensity values of the exposed pixels.

The instant invention further provides a computer program product comprising computer readable program code stored on computer readable storage medium embodied therein for modifying images characterized in that it includes the ability to assign colour intensity values to pixels exposed during image manipulation operations comprising:

computer readable program code means configured for using the color intensity values of remaining pixels in the original image, and computer readable program code means configured for assigning color values to the exposed pixels that are similar to those of the surrounding pixels so that the exposed regions blends smoothly with the surrounding region.

The above computer program product includes computer readable program code means configured for the user to generate manual modifications of the exposed pixel.

The above computer program product includes computer readable program code means configured for automatic modifications of regions of said image for filling colour intensity values for the said exposed pixels.

The said computer readable program code means configured for assigning colour values assigns the value of colour intensity based on the colour intensity value function determined at that pixel's location.

The said color intensity value function used to assign values to exposed pixels is determined using the image model available a-priori.

The said color intensity value function used to assign values to exposed pixels is determined by fitting a function to the known color intensity values at the boundary pixels of the exposed region.

The color intensity value function is approximated using energy minimization along with boundary conditions.

The said color intensity value function is based on a multi-point derivative estimation which is used as an approximation to the smoothness functional that is used to constrain the energy minimization.

The said computer readable program code means configured for assigning colour values assigns a colour value to an exposed pixel equal to the color intensity value of its mirror-image pixel found by looking into a hypothetical mirror placed along the boundary of the exposed region.

The said computer readable program code means configured for assigning colour values segments the original image to restrict the pixels, which are used to assign intensity values to the exposed pixels by using:

computer readable program code means configured for copying the intensity value from only that pixel location that belongs to the same segment as the boundary pixel which intersects the normal to the boundary and the boundary, computer readable program code means configured for copying the intensity value from only that pixel location that belongs to a segment with a minimum contact length with the exposed region.

The user explicitly restrains the area from where intensity values may be used to determined the intensity values that have to be assigned to the exposed pixels.

The for an original image that has been compressed using a lossy compression technique and wherein said means for assigning colour values to the exposed pixels includes:

computer readable program code means configured for performing median filtering on the boundary pixels not belonging to the exposed region but surrounding the exposed region where the median filtering mask does not use the pixels inside the exposed region;

computer readable program code means configured for ensuring that the pixels that are closer than a predetermined distance to the exposed region boundary are not used while determining the intensity values of the exposed pixels.

BRIEF DESCRIPTION OF THE DRAWINGS

The invention will now be described with reference to the accompanying drawings.

DETAILED DESCRIPTION OF THE DRAWINGS

Figure 1B:
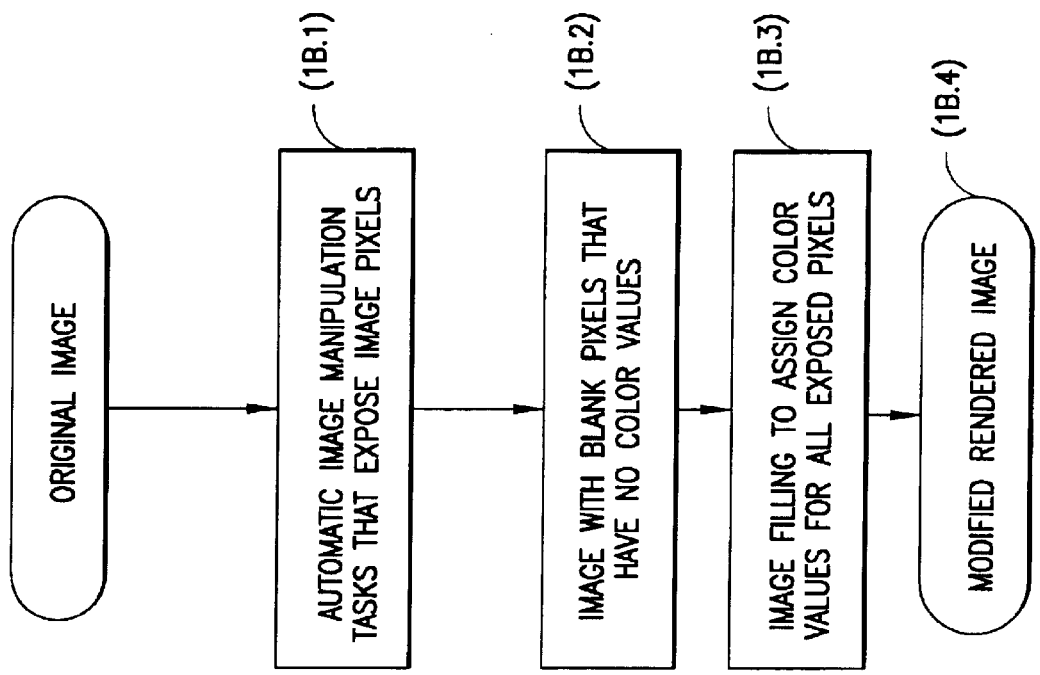
FIG. 1b shows a flow chart describing the steps involved during automatic image modification and subsequent rendering of exposed pixels, according to this invention
Figure 1A:
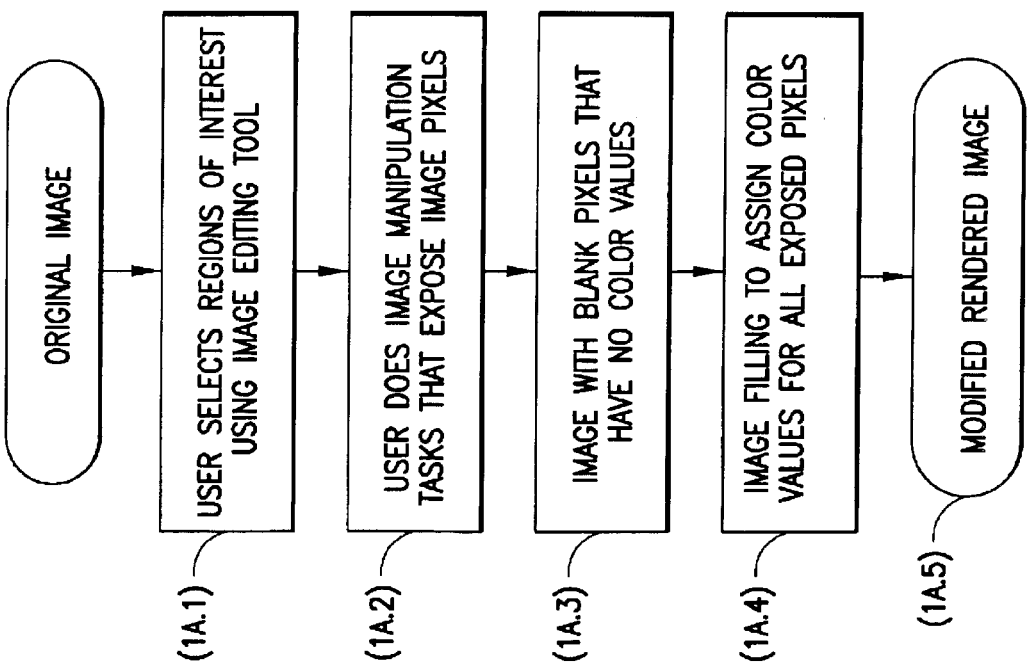
FIG. 1a shows a flow chart describing the steps involved during manual image modification and subsequent rendering of exposed pixels, according to this invention

FIG. 1A shows the flow diagram of the steps involved during manual image modification. Various image manipulation and modification tasks generate "exposed pixels" that do not have any color intensity value assigned to them. Such blank pixels may be generated when the user manually selects regions of interest in an image using a graphical user interface of some image editing software. FIG. 1A comprises of the following steps:

A user selects regions of interest using an image editing tool to do operations like delete, move, scale-down, and rotate (1A.1). The desired operations are then performed (1A.2) and generate blank pixels in the modified image (1A.3). These pixels are assigned color intensity values in order to get a visually acceptable version of the modified image (14.4). The result is a rendered image where the exposed pixels have been filled with color intensity values in such a way that the exposed region is virtually indistinguishable from surrounding background regions (14.5).

The exposed regions may also be generated as a result of some automatic image manipulation tasks on the original image as shown in FIB. 1B. Such an automatic modification step may use image-segmentation to extract objects present in the image before modifying them in different ways. The following steps are involved during automatic image modification. The automatic image manipulation task exposes image pixels (1B.1). The image with blank pixels that have no colour value (1B.2) are filled to assign colour values for all exposed pixels (1B.3). Thus, the modified image is rendered in a manner that is visually acceptable (1B.4).

Figure 2:
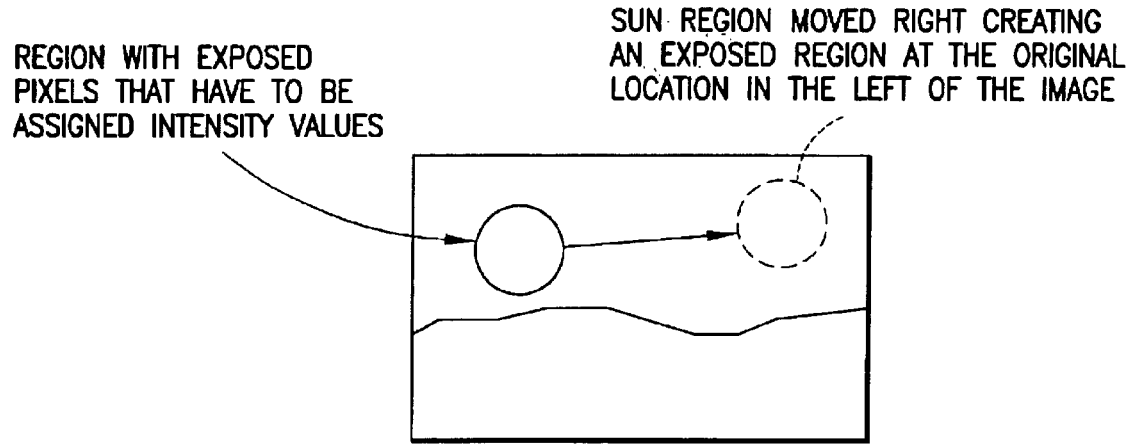
FIG. 2 shows an example of modified image that has an exposed region generated due to an image manipulation.

FIG. 2 shows an example of sunset image where the user desires to move the sun towards right-side of the image. The user selects the pixels in the image corresponding to the sun and moves the selected region towards the right. This creates a blank hole at the original position of the sun in the image. The pixels in this region no longer have any color intensity values assigned to them. This exposed region needs to be filled, i.e., color intensity values have to be assigned so that the exposed region blends with the sky background and the original region becomes indistinguishable from the sky region.

Figure 3:
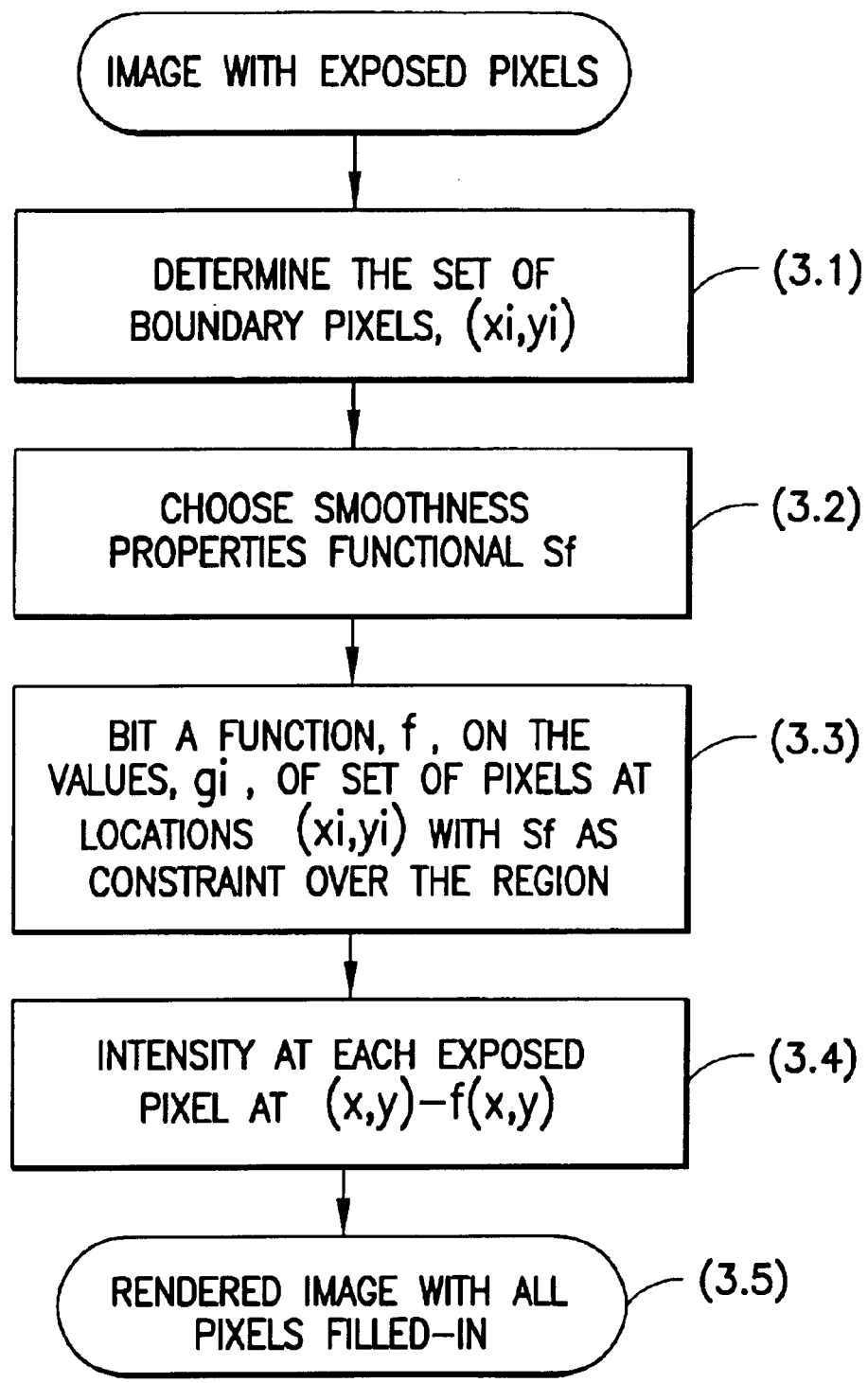
FIG. 3 shows a flow diagram that illustrates the method of fitting a function to the pixels values surrounding the exposed region and using this function to approximate the exposed pixel values, according to this invention

FIG. 3 shows a flow-chart for a method to fill the exposed pixels by minimizing an energy function.

An image with exposed pixels, determine the set of boundary pixels (xi, yi) (3.1), to choose the smoothness properties function Sf (3.2) to fit a function 'f', on the values gi, of set of pixels at location (xi, yi) with Sf, as constraint over the region (3.3). the intensity at each exposed pixel (x,y)=f(x,y) (3.4). it then renders the image with all pixels filled in (3.5).

The basic idea is to fit a function to the color values of the boundary pixels and the estimated values of this function at the location of an exposed pixel is used to fill that pixel. Some smoothness assumptions are made regarding the function to be fitted to the color values of the boundary pixels.

Let $f(x,v)$ be a function of pixel location in an image or of rotationally transformed pixel. Let locations $(x_i, y_i) \in \Re$ be the set of boundary pixels of the candidate image region (3.1), and $g_i$ be the pixel color intensity value at the i-th boundary pixel at location $(x_i, y_i)$ (3.1). Then pixel colors $f(x,y)$ at location (x,y) inside the candidate region is obtained by minimizing (3.4)

$$E = \Sigma (f(x_i, y_i) - g_i)^2 + \lambda \int \int S_f dy dx,$$

where $S_f$ is a smoothness measure of the function $f$, $S_f$ (3.2) is of form $$S_f = \left(\frac{\partial^2 f}{\partial x^2}\right)^2 + 2\left(\frac{\partial^2 f}{\partial x \partial y}\right)^2 + \left(\frac{\partial^2 f}{\partial y^2}\right)^2$$

Or, $$S_f = \left(\frac{\partial f}{\partial x}\right)^2 + \left(\frac{\partial f}{\partial y}\right)^2$$

Or, $$S_f = \left(\frac{\partial^2 f}{\partial x^2}\right)^2 + 2\left(\frac{\partial^2 f}{\partial x \partial y}\right)^2 + \left(\frac{\partial^2 f}{\partial y^2}\right)^2 + a\left[\left(\frac{\partial f}{\partial x}\right)^2 + \left(\frac{\partial f}{\partial y}\right)^2\right]$$

$$S_f = \left(\frac{\partial^2 f}{\partial x^2}\right)^2 + 2\left(\frac{2\partial^2 f}{\partial x \partial y}\right)^2 + \left(\frac{\partial^2 f}{\partial y^2}\right)^2$$

is a curvature functional whereas $$S_f = \left(\frac{\partial f}{\partial x}\right)^2 + \left(\frac{\partial f}{\partial y}\right)^2$$

is a gradient functional. Minimization of curvature functional ensures a minimally curved interpolated surface, while minimization of gradient functional leads to a flat (constant) interpolated surface. The choice of $S_f$ (3.2) depends on the pixel values surrounding the exposed region. If the surrounding pixel values have strong intensity variation, e.g., measured using normalized standard deviation, then it is preferred to perform curvature minimization. If the variation is nominal, gradient minimization is preferable.

If $$S_f = \left(\frac{\partial f}{\partial x}\right)^2 + \left(\frac{\partial f}{\partial y}\right)^2,$$

minimization of E leads to a partial differential equation of the form $\delta(i)f(x_i,y_i)+\lambda[f_{xx}+f_{yy}]=\delta(i)g_i$ with certain boundary conditions. $\delta(i)=1$ if $(x_i,y_i)\in\Re$ and $\delta(i)=001$ if $(x_i,y_i)\notin\Re$, $f_{xx}(i)$ and $f_{yy}(i)$ can be implemented using many variations of finite-difference formulas, reported in prior art such as Numerical Methods by Wolfgang Boehm and Hartmut Prautzsch, A K Peters, 1992, pages 132–133. One example of such is $f_{xx}(i)=f(i-1)-2f(i)+f(i+1)$ This is a 3-point finite-difference scheme. More points can be used for calculating $f_{xx}(i)$ and $f_{yy}(i)$, such as the 4-point difference scheme of $f_{yy}(i)=2f(i)-5f(i+1)+4f(i+2)-f(i+3)$ or $f_{xx}(i)=-f(i-3)+4f(i-2)-5f(i-1)+2f(i)$. If larger number of points is used for calculating derivatives, then essentially, more information from the surrounding pixels is used for calculating the intensity values of the exposed pixels. However, using larger number of points reduces the speed of filling operation.

Boundary conditions control the performance of pixel rendering, and should be chosen based on the variation of surrounding pixel intensities. If the variation is nominal, $f_y(i)$ and $f_x(i)$ are assumed to be zero on the boundary pixels. Otherwise zero curvature values are enforced on the boundary.

Figure 4:
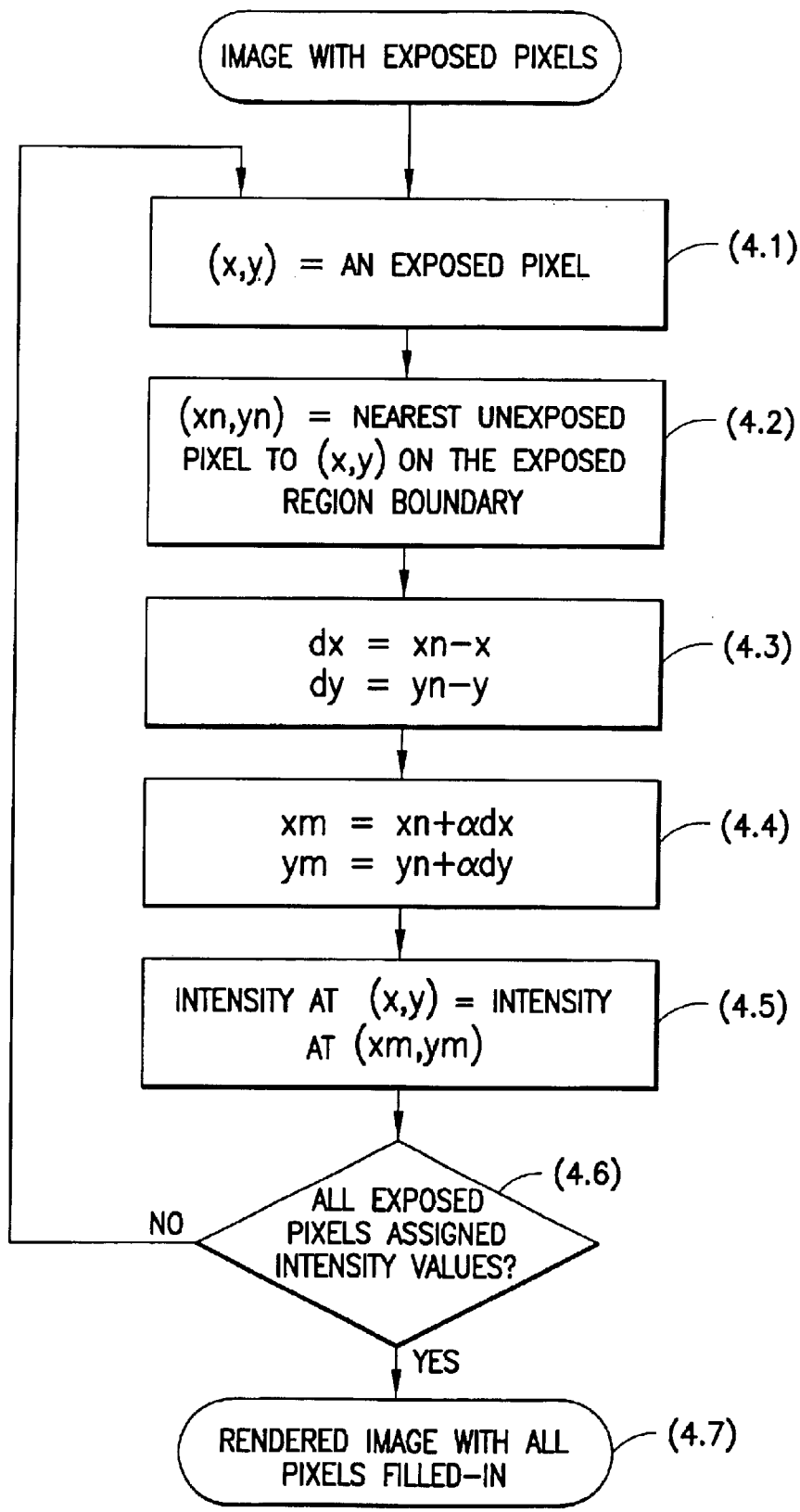
FIG. 4 shows the flow diagram that describes the method used for assigning intensity values to exposed pixels using the mirroring approach, according to this invention FIG. 5 demonstrates the method of assigning intensity value to a pixel using the mirroring approach, according to this invention

FIG. 4 describes a flow chart for an alternative embodiment, which does not place constraints of smoothness and continuity on the function to be fitted. This method copies the color intensity values from the pixels outside the closed region by assuming that a mirror is placed all along the exposed region boundary. The method proceeds by identifying each pixel (x,y) (4.1) in the exposed region and assigns the color intensity value of its "mirror-image" pixel to this exposed pixel. The "mirror-image" pixel is found by locating the nearest unexposed pixel $(x_n,y_n)$ (4.2) on the exposed region boundary in the original image. Using the principle that the line joining the exposed pixel to nearest boundary pixel is actually the normal to the region boundary at the nearest boundary pixel, the mirror-image pixel may be found easily using integer arithmetic. This mirror image pixel is determined as follows:

$dx=x_n-x$ $dy=y_n-y$ (4.3)

$x_m=x_n+dx$ $y_m=y_n+dy$ (4.4)

Once all the exposed pixels have been assigned intensity values in this manner (4.6) we have a rendered image with all filled in pixels (4.7).

Figure 5:
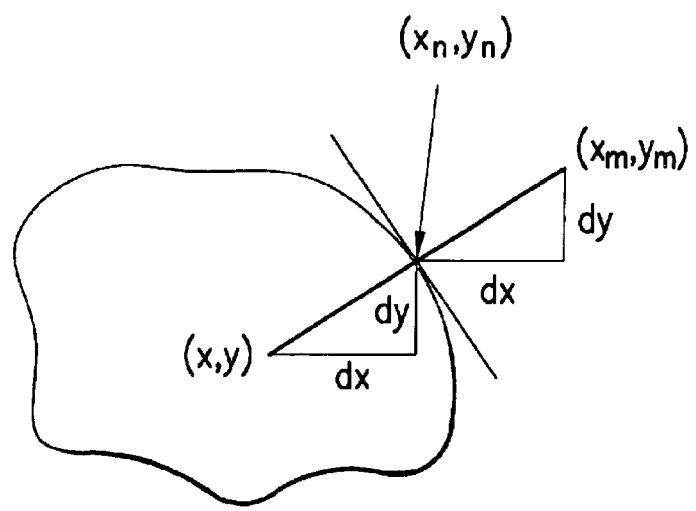

FIG. 5 demonstrates the method for assigning intensity value to a pixel using mirroring approach. The exposed pixel (x,y) is assigned the color intensity values of the pixel at $(x_m,y_m)$. The color intensity values in the exposed region are similar to those surrounding the region and individual pixels in the exposed region have higher-order derivatives that are similar to those surrounding the region with a sign change. The higher-order derivatives may no longer be continuous at the boundary pixels, though they are all zeros at the boundary pixels due to the mirroring of values. The approximated intensity function, $f$, retains smoothness properties similar to those outside the exposed region since the pixel values are replicated from outside. This scheme of mirroring pixels to fill the exposed region preserves the texture present in the regions surrounding the exposed region and, thus, renders the modified image realistically.

A preferred embodiment for rendering images with exposed regions by filling the exposed pixels with color intensity values is described now. The process begins with identification of the closed region with pixels that have to be assigned intensity values. Thereafter, the pixels in the original image from where the color intensity values may be copied onto the exposed pixels is determined. This is identified by doing a color-segmentation of the original image. Image segmentation partitions the original image into segments which assigns a unique label to each pixel in the image. Such color-based image segmentation usually extracts the "objects" in the image and generates an object-level view of the image. Typically, the manual or automatic image manipulation steps expose pixels belonging to a combination of one or more entire segments.

Figure 6:
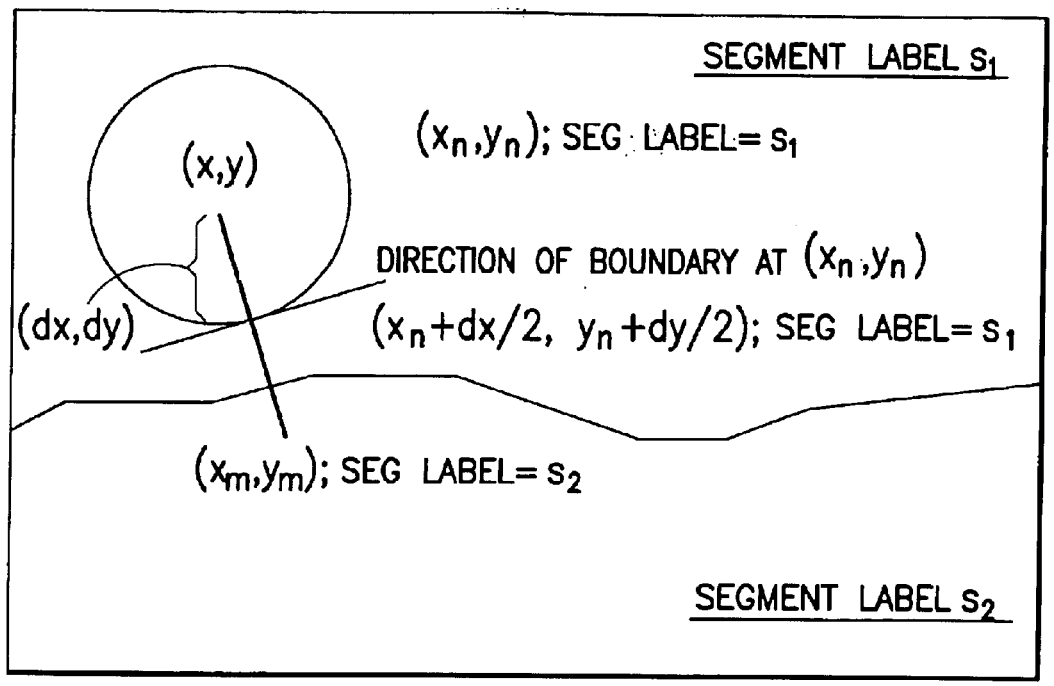
FIG. 6 illustrates an example of an exposed pixel whose mirror-image does not lie in the same segment as the nearest boundary pixel

FIG. 6 shows an exposed pixel whose mirror image does not lie in the same segment as the nearest boundary pixel. For each pixel (x,y) in the exposed region, its mirror-image pixel $(x_m,y_m)$ is determined as outlined above with additional constraints as described below.

a) The segment label, $s_n$, is determined for the boundary pixel $(x_n,y_n)$ which is nearest to the exposed pixel (x,y) being filled currently.

b) The segment label, $s_m$, is determined for the true mirror-image pixel $(x_m,y_m)$ c) If the segment labels, $s_n$ and $s_m$ are not same, then the true mirror-image pixel $(x_m,y_m)$ will not be used for filling the exposed pixel (x,y). This ensures that the exposed region is filled with only pixels belonging to the object or the background surrounding it in the original image and not from those objects/background that do not touch the exposed region. A new pixel $(x'_m,y'_m)$ is determined along the direction of the normal to the boundary at the point $(x_n,y_n)$ such that it has the segment label of $s_n$. One such scheme is to use a binary approach and halve the displacements (dx,dy) of the exposed pixel (x,y)) from the boundary pixel $(x_n,y_n)$ and checking if the segment label at pixel location $(x_n+dx/2,y_n+dy/2)$ has the segment label $s_n$. If yes, then the intensity value of this pixel is used to copy into the exposed pixel or else the displacements (dx,dy) are further halved. This process may be continued until a pixel with the segment label $s_n$ is found or for fixed number of iterations after which heuristics may be used to select intensity values to fill the exposed pixel, e.g., by the average of color intensities of the pixels with segment labels $s_n$.

d) For realistic rendering of real-world images, it may be assumed that the exposed region belonged to a foreground object and that these exposed pixels need to be filled with intensity values from the background object and not from other foreground objects which may be contiguous to the exposed region. The scheme, first determines the contact percentages for all segments that touch the exposed region. Contact percentage of a segment $s_i$ is the ratio of the number of boundary pixels that the segment $s_i$ has in common with the exposed region to the total number of boundary pixels of the exposed region. Then, while determining the boundary pixel $(x_n, y_n)$ closest to the exposed pixel, if the segment $s_n$ to which this boundary pixel belongs has a contact percentage of less than a predetermined ratio, e.g., 20%, then this boundary pixel is ignored and the next nearest boundary pixel is found. This process is repeated until the nearest boundary pixel with a segment label that has a contact percentage of greater than 20% is found.

Unrealistic rendering may be done by the mirroring approach if neighboring pixels are assigned values from pixels that are not near each other. These artifacts are produced when the angle between the two shortest normals of neighboring exposed pixels is large. Whenever this happens, the values to the exposed pixels are assigned from pixels that are not in the neighborhood of each other but are rather far apart in the surrounding region. These values may, thus, be quite different and may therefore generate peculiarities at the exposed pixel locations. This effect is minimized by determining multiple shortest normals to the boundary for every exposed pixel. One normal is the shortest normal to the boundary and others are chosen in the increasing order of normal length. Another preferred embodiment uses two more normals in addition to the shortest normal.

Figure 7:
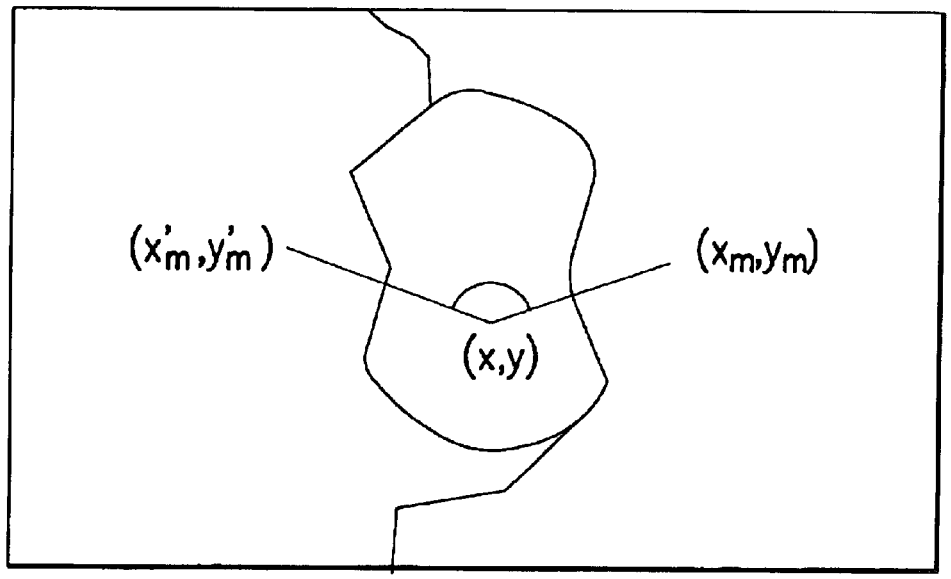
FIG. 7 is an illustrative example of an exposed pixel, which may lead to artifacts in the rendered image.

FIG. 7 shows an exposed pixel, which may lead to artifacts in the rendered image. Such an exposed pixel may result if the angle between the shortest normal and other normals is larger than a fixed threshold, e.g., 45°, This kind of exposed pixel is marked as a special pixel. For such cases, after all exposed pixels have been assigned intensity values, a low-pass filter like averaging or median is applied to the special pixels so that the artifacts, if any, may be reduced.

In an alternative embodiment, image segmentation is not employed to determine the regions from where pixel intensity values may be copied. Instead the user may explicitly specify the boundary of the regions from where mirroring can be done.

Figure 8:
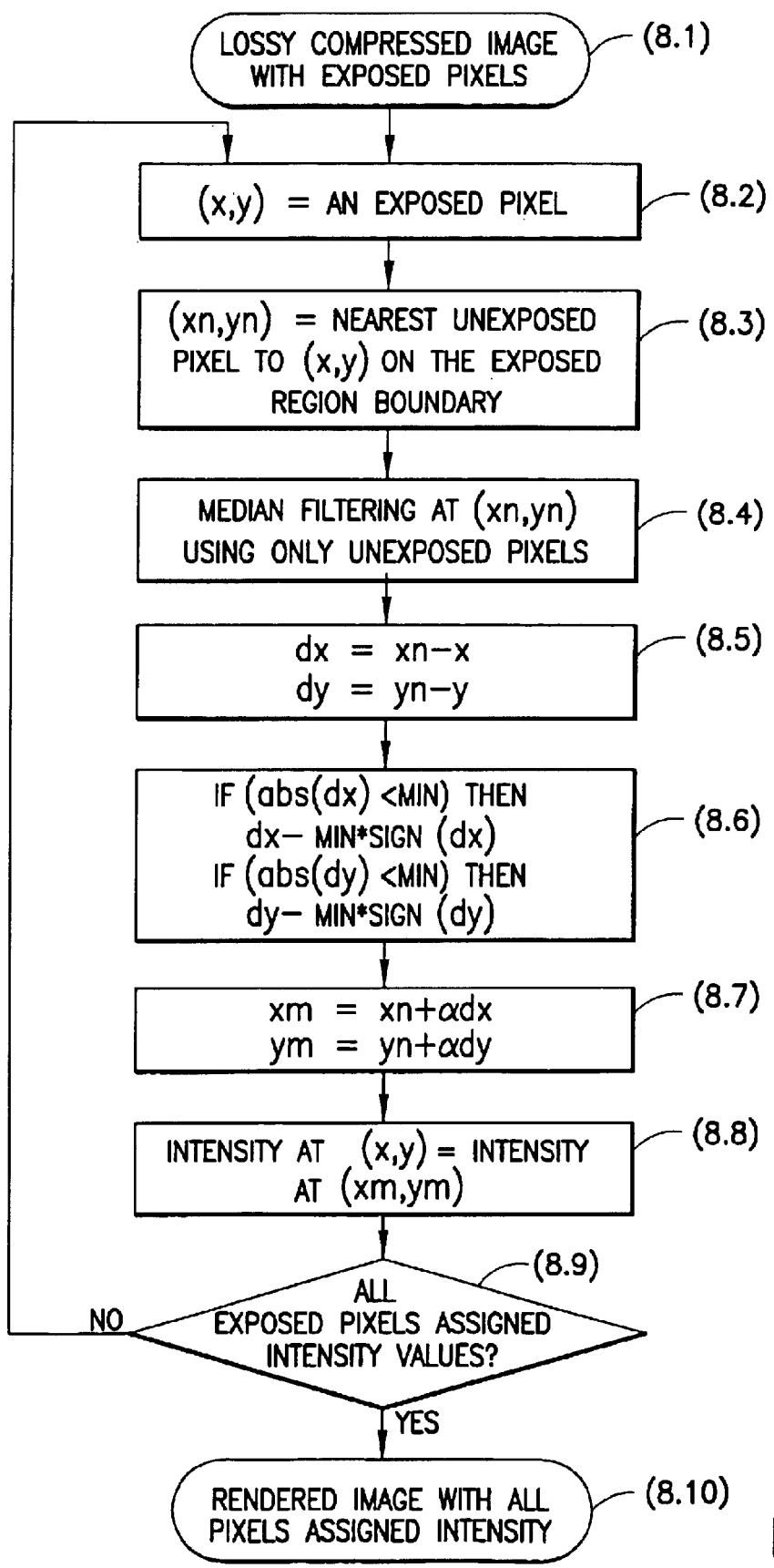
FIG. 8 is the flow diagram of the scheme used for assigning intensity values to exposed pixels in a lossy compressed image.

FIG. 8 shows the flow diagram for assigning intensity values to expose pixels in a lossy compressed image. In this preferred embodiment for images compressed in size using lossy compression techniques like JPEG, the method for filling up exposed pixels involves an additional series of steps to improve the visual quality of the final rendered image. The steps of assigning color values to exposed pixels in a lossy compressed image are described below:

The lossy compressed image with exposed pixels (8.1), where x, y=exposed pixels (8.2), and xn, yn=nearest unexposed pixel to x, y on the exposed region boundary (8.3), then the median filtering is carried out at xn, yn using only unexposed pixel (8.4).

If $dx=xn-x$, $dy=yn-y$ (8.5) and

If $(abs(dx)<MIN)$ then $dx=MIN*sign(dx)$ if $(abs(dy)<MIN)$ then $dy=MIN*sign(Dy)$ (8.6)

then $xn=xn+\alpha dx$, $yn=yn+\alpha dy$ (8.7)

Then the intensity at (x,y)=intensity at (xm, ym) (8.8). If all pixels are assigned intensity value (8.9) then the rendered image with all pixels are assigned intensity (8.10) otherwise continue the process on the next exposed pixels (x, y) (8.2).

The edges in a lossy compressed image are not sharp. Hence, object-level manipulation of such images leaves behind pixels outside the exposed region boundary that have color intensity values similar to those inside the exposed region in the original image. The above mentioned schemes of intensity function interpolation and pixel mirroring fill up only the exposed region pixels which may product strange artifacts in the rendered image due to the unsharp edge pixels that were not exposed but had intensity value sufficiently different from those of the surrounding regions to cause visual anomalies. The proposed scheme despeckles these regions by using median filtering on the pixels that are outside the exposed region and along the exposed region boundary.

Further, the scheme ensures that the mirroring distance is at least greater than a predetermined minimum distance, e.g. 3 pixels. This ensures that the exposed pixels will be get intensity values from pixels that are sufficiently far away from the boundary and hence will not suffer from the unsharp edge effects.

What is claimed is:

1. A system for modifying images having the ability to assign color intensity values to pixels exposed during image manipulation operations, said system comprising:

means for using the color intensity values of remaining pixels in the original image, and means for assigning color values to the exposed pixels that are similar to those of the surrounding pixels so that the exposed regions blend smoothly with the surrounding region, wherein said means for assigning color values asigns a color value to an exposed pixel equal to the color intensity value of a mirror-image pixel of said exposed pixel.

2. The system as claimed in claim 1, including means for assigning color values when pixels are exposed due to manual modifications of the image.

3. The system as claimed in claim 1, including means for assigning color values when the pixels are exposed due to automatic modifications of said image.

4. The system as claimed in claim 1, wherein said means for assigning color values assigns the value of color intensity based on the color intensity value function determined at a location of said exposed pixel.

5. The system as claimed in claim 4, wherein the said color intensity value function used to assign values to exposed pixels is determined using the image model available a-priori.

6. The system as claimed in claim 1, wherein said mirror-image pixel is found by looking into a hypothetical mirror placed along the boundary of the exposed region.

7. The system as claimed in claim 1, wherein said means for assigning color values segments the original image to restrict the pixels, which are used to assign intensity values to the exposed pixels by using:

means for copying the intensity value from only that pixel location that belongs to the same segment as the boundary pixel which intersects the normal to the boundary and the boundary, means for copying the intensity value from only that pixel location that belongs to a segment with a minimum contact length with the exposed region.

8. The system as claimed in claim 1, wherein the user explicitly restrains the area from where intensity values may be used to determined the intensity values that have to be assigned to the exposed pixels.

9. The system as claimed in claim 1, wherein for an original image that has been compressed using a lossy compression technique and wherein said means for assigning color values to the exposed pixels includes:

means for performing median filtering on the boundary pixels not belonging to the exposed region but surrounding the exposed region where the median filtering mask does not use the pixels inside the exposed region;

means for ensuring that the pixels that are closer than a predetermined distance to the exposed region boundary are not used while determining the intensity values of the exposed pixels.

10. A method for modifying images having the ability to assign color intensity values to pixels exposed during image manipulation operations, said method comprising:

using the color intensity values of remaining pixels in the original image, assigning color values to the exposed pixels that are similar to those of the surrounding pixels so that the exposed regions blend smoothly with the surrounding region, and assigning a color value to an exposed pixel equal to the color intensity value of a mirror-image pixel of said exposed pixel.

11. The method as claimed in claim 10, including assigning color values when the pixels are exposed as a result of manual modification of image regions by the user.

12. The method as claimed in claim 10, including assigning color values when the pixels are exposed as a result of automatic modification of said image regions.

13. The method as claimed in claim 10, wherein said assigning of color values assigns the value of color intensity based on the color intensity value function determined at a location of said exposed pixel.

14. The method as claimed in claim 13, wherein said color intensity value function used to assign values to exposed pixels is determined using the image model available a-priori.

15. The method as claimed in claim 10, wherein said mirror-image pixel is found by looking into a hypothetical mirror placed along the boundary of the exposed region.

16. The method as claimed in claim 10, wherein said assigning of color values segments the original image to restrict the pixels, which are used to assign intensity values to the exposed pixels by using:

copying the intensity value from only that pixel location that belongs to the same segment as the boundary pixel which intersects the normal to the boundary and the boundary, copying the intensity value from only that pixel location that belongs to a segment with a minimum contact length with the exposed region.

17. The method as claimed in claim 10, wherein the user explicitly restrains the area from where intensity values may be used to determined the intensity values that have to be assigned to the exposed pixels.

18. The method as claimed in claim 10, wherein for an original image that has been compressed using a lossy compression technique and wherein said means for assigning color values to the exposed pixels includes:

performing median filtering on the boundary pixels not belonging to the exposed region but surrounding the exposed region where the median filtering mask does not use the pixels inside the exposed region;

ensuring that the pixels that are closer than a predetermined distance to the exposed region boundary are not used while determining the intensity values of the exposed pixels.

19. A computer program product comprising computer readable program code stored on computer readable storage medium embodied therein for modifying images having the ability to assign color intensity values to pixels exposed during image manipulation operations comprising:

computer readable program code means configured for using the color intensity values of remaining pixels in the original image, and computer readable program code means configured for assigning color values to the exposed pixels that are similar to those of the surrounding pixels so that the exposed regions blend smoothly with the surrounding region, and computer readable program code means configured for assigning a color value to an exposed pixel equal to the color intensity value of a mirror-image pixel of said exposed pixel.

20. The computer program product as claimed in claim 19, including computer readable program code means configured for assigning color values to pixels exposed as a result of manual modifications of image regions.

21. The computer program product as claimed in claim 19, including computer readable program code means configured for assigning color values to pixels exposed as a result of automatic modifications of said image regions.

22. The computer program product as claimed in claim 19, wherein said computer readable program code means configured for assigning color values assigns the value of color intensity based on the color intensity value function determined at a location of said exposed pixel.

23. The computer program product as claimed in claim 22, wherein said color intensity value function used to assign values to exposed pixels is determined using the image model available a-priori.

24. The computer program product as claimed in claim 19, wherein said mirror-image pixel is found by looking into a hypothetical mirror placed along the boundary of the exposed region.

25. The computer program product as claimed in claim 19, wherein said computer readable program code means configured for assigning color values segments the original image to restrict the pixels, which are used to assign intensity values to the exposed pixels by using:

computer readable program code means configured for copying the intensity value from only that pixel location that belongs to the same segment as the boundary pixel which intersects the normal to the boundary and the boundary, computer readable program code means configured for copying the intensity value from only that pixel location that belongs to a segment with a minimum contact length with the exposed region.

26. The computer program product as claimed in claim 19, wherein the user explicitly restrains the area from where intensity values may be used to determined the intensity values that have to be assigned to the exposed pixels.

27. The computer program product as claimed in claim 19, wherein for an original image that has been compressed using a lossy compression technique and wherein said means for assigning color values to the exposed pixels includes:

computer readable program code means configured for performing median filtering on the boundary pixels not belonging to the exposed region but surrounding the exposed region where the median filtering mask does not use the pixels inside the exposed region;

computer readable program code means configured for ensuring that the pixels that are closer than a predetermined distance to the exposed region boundary are not used while determining the intensity values of the exposed pixels.

* * * * *